UNITED STATES PATENT OFFICE.

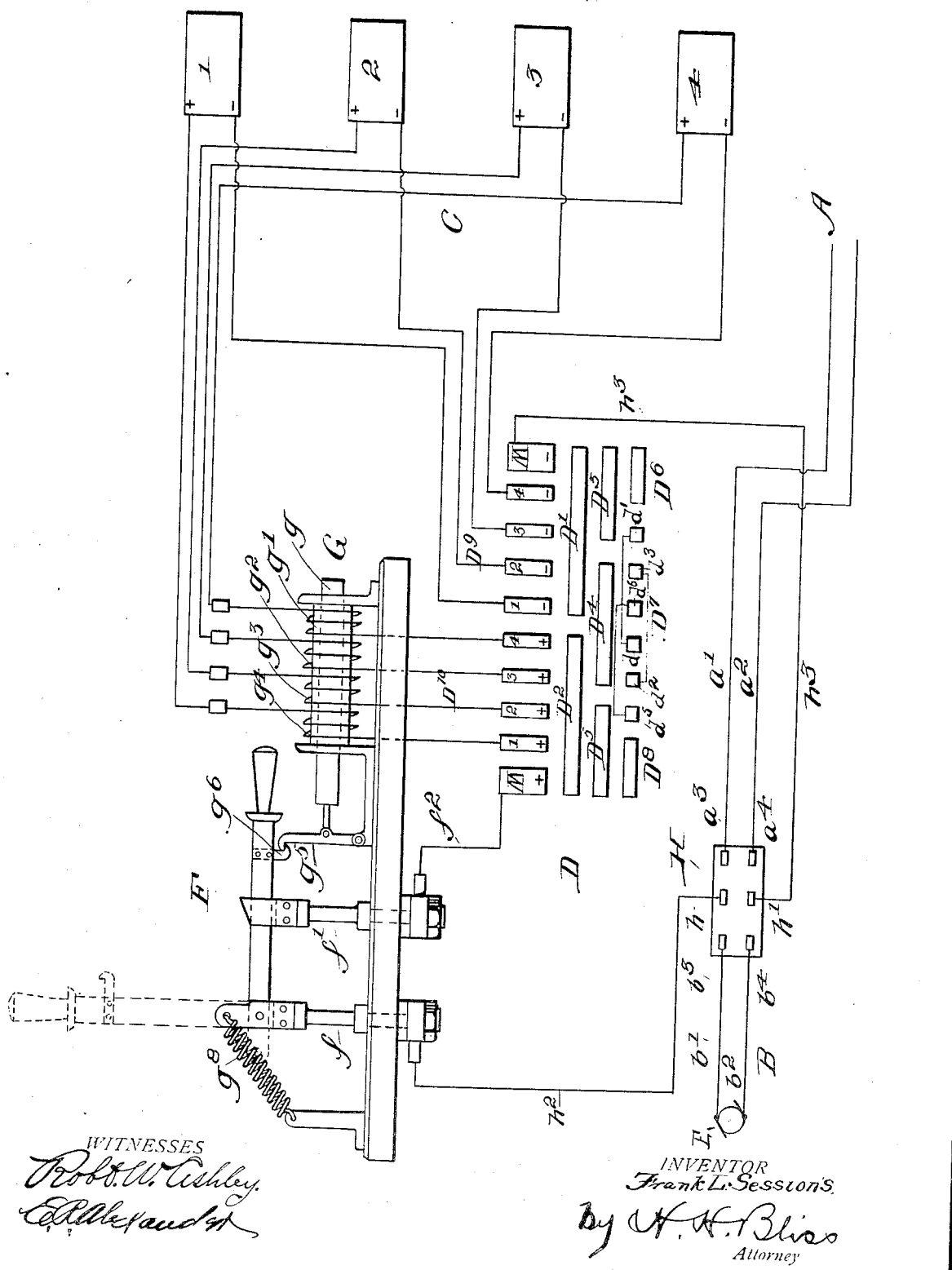

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

CIRCUIT-BREAKER.

971,082.  Specification of Letters Patent.  Patented Sept. 27, 1910.

Application filed August 6, 1903, Serial No. 168,531. Renewed September 14, 1905. Serial No. 278,483.

*To all whom it may concern:*

Be it known that I, FRANK L. SESSIONS, a citizen of the United States, residing at Columbus, in the county of Franklin and State of Ohio, have invented certain new and useful Improvements in Circuit-Breakers, of which the following is a specification, reference being had therein to the accompanying drawing.

This invention relates to improvements in protective devices used to prevent an excessive draft of current on the units of a plurality either of sources of electrical energy or consumers of electrical energy which are adapted to be connected in multiple, in series or in various series multiple combinations with a single working or supply circuit respectively.

My invention obviates the necessity for supplying separate circuit breakers with each unit of such a plurality of units, one circuit breaker automatically protecting all the units regardless of the manner in which they are connected to the working circuit.

I have taken to illustrate my invention a storage battery, of which the cells or groups of cells may be connected in a variety of ways to either a single supply circuit or working circuit. As thus applied, my invention results in the securing of advantageous results specific to storage batteries, and my invention is especially useful in connection with storage batteries.

As applied to storage batteries, this invention relates to improvements in the construction and arrangement of the parts by which storage batteries are connected to the charging lines, and also may be connected to the motor or other translating devices which they are to operate.

It has for its object to provide an apparatus for taking the current to and from the cells of a storage battery in such manner that they shall be under full protection, and at the same time in such way that they can be connected in several ways in comparatively rapid succession with the several parts of the circuit without shock to any of the parts of the system.

In the drawings I have shown more or less conventionally, and by means of what may be regarded as a diagram, a set of parts and the relative arrangement thereof which embody my improvements.

A indicates the incoming and outgoing, or positive and negative ends of the electric circuit from which current is derived for the charging of the cells of the storage battery.

B indicates the two sets of conductors of the circuit which extend to the motor or motors or other translating devices and to which current is conveyed from the battery in the manner to be described.

The storage battery itself is conventionally illustrated by C. It may be composed of any desired number of unit cells. These, considering the entire number, are so divided or grouped that there shall be several sets or groups, as I shall call them, of cells, of any desired number, and each group containing any desired number of cells. For the sake of illustration I have shown the cells as divided into groups of 1, 2, 3, and 4.

Between the battery and the charging lines at A, on the one hand, and the motor circuit at B, leading to the motor E, on the other, I interpose a controller indicated as an entirety by D, a circuit breaker at F and a tripping magnet at G, together with such switches and current changers as are necessary.

At H there is a double pole double throw switch having terminals $h$, $h'$ adapted on the one hand to be respectively connected to the terminals $a^3$, $a^4$ of the charging lines $a'$, $a^2$, or to be connected to the terminals $b^3$, $b^4$ of the motor lines at $b'$, $b^2$.

$h^2$ is a conductor section leading from the terminal $h$ of the switch-board to the hinge post $f$ of the circuit breaking lever F.

$f'$ is the contact post for the lever and connected by conductor section $f^2$ with the out-leading terminal of the controller. The latter is indicated as a whole by D, and may be constructed in any of many ways capable of accomplishing the following purpose. I prefer to employ a controller of the rotary drum or barrel type. It has a main line terminal M— for the in-leading main line conductor $h^3$ running from the switch contact at $h'$, the out-leading main line terminal contact M+ connected to the aforesaid conductor $f^2$, and between these two series of contacts $D^9$ and $D^{10}$, those at $D^9$, respectively, being connected with the negative terminals of the battery groups, respectively, and those at $D^{10}$ being connected, respectively, with the positive terminals of the battery groups. To assist in following the circuits, the stationary controller contacts are, respectively, marked 1—, 2—, 3—, 4—, corresponding, respectively, with the battery groups, with whose negative terminals they are connected. And the contacts in the series $D^{10}$ are 1+, 2+, 3+, 4+, in correspondence with the positive terminals of the several groups with which they are connected. The movable part of the controller is provided with several series of connector bars, those in one series being shown at $D'$, $D^2$, those in the next series at $D^3$, $D^4$, $D^5$, and those in the next at $D^6$, $D^7$, $D^8$.

It will be seen that when the controller is turned part way, it electrically connects all of the contacts of the negative series $D^9$ and the in-leading contact M—; and that, at the same time, the connector bar $D^2$ is electrically connected to all of the contacts in the series $D^{10}$, and also to the outleading contact M+.

When the parts are situated in the way just described, the current will come from all of the groups 1, 2, 3, 4 of the battery in parallel to the connector bar $D^2$, and go thence through the circuit breaker to one side of the working line and return from the other side of said line through the contacts $b^4$, $h'$ and conductor $h^3$ to the contact M—. When the controller is turned into the second position the contact bar $D^3$ electrically unites the in-leading contact M—, and the contacts 4—, 3—, of the cell groups 4 and 3; the contact bar $D^4$ unites the contacts 2—, 1—, 4+ and 3+ and the bar $D^5$ connects the contacts 2+, 1+ and M+. Under this adjustment of the parts, it will be seen, that the groups are so arranged electrically that those of one pair are in parallel with each other, and those of a second pair are in parallel with each other, and the two pairs are in series.

If the controller be carried to the third position indicated, the connector bars or plates at $D^6$, $D^7$ $D^8$ are brought into action. The connector $D^6$ electrically joins the contacts M— and 4—, and the incoming current passes to the negative side of the cell group 4, then goes from the positive side thereof to the controller contacts 4+ and $d$, and thence in sequence through contact $d'$, contact 3—, cell group 3, then from the latter to the contacts 3+ $d^2$, $d^3$, 2—, cell group 2, contacts 2+, $d^5$, $d^6$ 1—, cell group 1, contacts 1+, $D^8$ and M+ and thence to the line. When the parts are thus connected up it will be seen that the cell groups are one after another in series with each other between the main line terminals.

One of the circuit connections of each of the cell groups (that one on the positive side of each group, as shown in the drawing) includes the turns of a magnet coil around the core $g$ of the magnet which trips the circuit breaking lever. As shown, there are four of these coils $g'$, $g^2$, $g^3$, $g^4$, respectively, interposed between the cell groups and the positive terminals of the controller. And in whatsoever combination the groups are put of those above described, it will be seen that it is always the case that the current from each group passes through its own single coil of the tripping magnet. The ampere turns around the magnet are the same when the groups of cells are respectively delivering the same current, irrespective of whether the groups are in series, or are arranged two in series and two in parallel, or arranged to have four in parallel. Consequently, the circuit breaker acts uniformly under all adjustments of the groups and at all times affords constant protection for the battery. If the current at any time passes the limit which has been predetermined the solenoid core $g$ is drawn backward, hook $g^5$ is pulled away from the hook $g^6$, and the spring $g^8$ quickly draws the lever or bar F away from the contact at $f'$ and the whole circuit is broken.

When the operation the reverse of that above described is to be performed, that is to say, when the battery cells are to be charged with current, the same advantages result from the construction and arrangement of the circuit breaker and the controller in relation to the latter. When so charging, the directions of the passage of the current may be regarded as the opposite to those above described, but otherwise the devices and their mode of operation are the same.

It will be observed that this circuit breaker is particularly adapted to protect the storage battery units and the conductors, contact devices, etc., leading to and from each of said units from an excessive draft of current. It will also be observed, however, that the circuit breaker is adapted to protect the electrical devices of the controller, switches, and working or supply circuits as well. Thus in the case of a system such as illustrated in the drawings, if the controller, switches and devices of the working or changing circuit are designed to carry an amperage equal to four times the maximum allowable amperage of each storage battery unit, the circuit breaker will act to prevent an excessive amperage in the working or supply circuits as well as the storage battery unit circuits.

What I claim is:—

1. The combination of two or more sources of electric supply, a working circuit connected therewith and taking current therefrom, an electromagnetic circuit breaker, having a magnet coil in circuit with each of the said sources of electric supply, and means for connecting with said working circuit the said sources of electric supply in parallel or in series at will, substantially as set forth.

2. The combination of two or more sources of electric supply, a working circuit, means for connecting the said sources of electric supply with said working circuit either in parallel or in series, an electro-magnetic circuit breaker in the said circuit having several coil sections, respectively, in circuit with said sources of electric supply and means for connecting the said sources of supply with the working circuit through the said coils in parallel or in series at will, as described.

3. In a storage battery system, the combination of two or more cells or cell groups each having two terminal conductor sections, a working circuit, means for connecting the said terminal conductor sections with the main circuit with the said cells or cell groups in parallel or in series at will, a circuit breaker in the said circuit having an electro-magnet formed with a plurality of coil sections, each coil section being in one of the terminal conductor sections of one of the cells or cell groups, substantially as set forth.

4. In a storage battery system, the combination of a working circuit, two or more cells or cell groups, a controller for connecting the said cells or cell groups with the working circuit in parallel or in series, an electro-magnet adapted to control or modify the working of the said circuit, and having a series of coil sections each interposed between the said controller and one of the cells or cell groups, substantially as set forth.

5. In a storage battery system, the combination of a working circuit, two or more cells or cell groups, means for connecting the said cells or cell groups with the working circuit in parallel or in series, an automatically movable conductor section in the circuit adapted to open and close it, and an electro-magnet having two or more coil sections, each permanently interposed between the said movable conductor section and one of the said cells or cell groups, substantially as set forth.

6. In a storage battery system, the combination of a working circuit, four cells or cell groups, means for connecting the said cells or cell groups either in parallel or in two pairs in series parallel or all four in series, a circuit breaker in the said circuit, and having an electro-magnet with four coil sections, each coil section being permanently interposed between one of the cells or cell groups and the circuit breaker, substantially as set forth.

7. In a storage battery system, the combination of a working circuit, a number of cells or cell groups which number is a multiple of two, means for connecting the said cells or all groups in series or parallel or in multiple series so that the electromotive forces of all the cells or cell groups in series are equal, a circuit breaker in the said circuit, and having an electromagnet with a coil section for each cell or cell group, each coil section being interposed between one of the cells or cell groups and the circuit breaker, substantially as set forth.

8. The combination of a plurality of sources of electrical energy, a working circuit, a controller for said working circuit adapted to connect the said sources of electrical power therewith either in series or in parallel, and an electromagnetic circuit breaker having a plurality of energizing coils each connected with one of said sources of electrical power and with said controller.

9. The combination of a plurality of sources of electrical energy, a working circuit, a series-parallel controller for the working circuit, and an electromagnetic circuit breaker having a plurality of energizing coils, each coil being interposed between one of said sources of electrical energy and a terminal contact therefor at the controller, substantially as set forth, whereby the ampere turns upon the circuit breaker are the same when each source of electrical energy is delivering the same current, irrespective of whether the said sources of electrical supply are connected up through said controller either in series, in parallel, or in series-parallel.

10. The combination of two or more electrical energy translating devices adapted to translate approximately equal amperage at any given time, a single circuit, a series-parallel controller interposed between said translating devices and said single circuit, and a circuit breaker, the switch of which is interposed in said single circuit, and having a plurality of magnet coils interposed between the translating devices and the controller.

11. The combination of two or more electrical energy translating devices, a single circuit, a series-parallel controller interposed between said devices and said circuit, and a circuit breaker of which the switch is interposed in said single circuit and which has two or more actuating coils, each connected respectively and independently of each other to the said translating devices.

In testimony whereof I affix my signature in presence of two witnesses.

FRANK L. SESSIONS.

Witnesses:
C. E. WAXBOM,
W. G. MATHO.